US009552642B2

(12) United States Patent
Heu et al.

(10) Patent No.: US 9,552,642 B2
(45) Date of Patent: Jan. 24, 2017

(54) APPARATUS AND METHOD FOR TRACKING OBJECT USING FEATURE DESCRIPTOR, AND APPARATUS AND METHOD FOR REMOVING GARBAGE FEATURE

(71) Applicant: SAMSUNG SDS CO., LTD., Seoul (KR)

(72) Inventors: Jun Hee Heu, Seoul (KR); Jeong Seon Yi, Yongin-si (KR); Yong Wook Jeong, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 187 days.

(21) Appl. No.: 13/906,783

(22) Filed: May 31, 2013

(65) Prior Publication Data

US 2013/0322763 A1  Dec. 5, 2013

(30) Foreign Application Priority Data

May 31, 2012 (KR) .......................... 10-2012-0058412

(51) Int. Cl.
G06T 7/00 (2006.01)
G06T 7/20 (2006.01)

(52) U.S. Cl.
CPC .............. *G06T 7/004* (2013.01); *G06T 7/2033* (2013.01); *G06T 2207/10016* (2013.01); *G06T 2207/20016* (2013.01)

(58) Field of Classification Search
CPC .................. G06T 7/004; G06T 7/20033; G06T 2207/10016; G06T 2207/20016
See application file for complete search history.

(56) References Cited

U.S. PATENT DOCUMENTS 6,711,293 B1   3/2004 Lowe
8,995,758 B1 *  3/2015 Bissacco et al. ............. 382/159
(Continued)

FOREIGN PATENT DOCUMENTS

JP      2005309782 A     11/2005
KR    1020050063991 A      6/2005
KR       100972849 B1      7/2010

OTHER PUBLICATIONS

International Search Report dated Aug. 27, 2013 from the International Searching Authority in counterpart Application No. PCT/KR2013/004840.

(Continued)

*Primary Examiner* — Edward Park
(74) *Attorney, Agent, or Firm* — Sughrue Mion, PLLC

(57) ABSTRACT

An apparatus and method for tracking an object using a feature descriptor and an apparatus and method for removing a garbage feature are disclosed. A feature descriptor generation unit generates a plurality of features descriptors indicating information of a plurality of features extracted from an input image from which an object of interest is desired to be detected. A matching unit matches the feature descriptors with feature descriptors of a target object stored in advance, and determines the feature descriptors of the object of interest corresponding to the target object. A feature point removal unit removes feature descriptors that do not meet a geometric comparison condition from among the feature descriptors of the object of interest, and establishes final feature descriptors of the object of interest.

24 Claims, 7 Drawing Sheets

(a)

(b)

(56) References Cited

U.S. PATENT DOCUMENTS

2009/0238460 A1     9/2009  Funayama et al.
2009/0304231 A1*   12/2009  Lu ........................ G06K 9/4628
                                                              382/103
2009/0324010 A1*   12/2009  Hou .............................. 382/103
2011/0134221 A1*    6/2011  Lee et al. ........................ 348/46

OTHER PUBLICATIONS

P. Putjarupong et al., "Image Registration Exploiting Five-point Coplanar Perspective Invariant and Maximum-Curvature Point," Journal of WSCG, vol. 12. No. 1-3, Feb. 6, 2004, 9 pages total.

* cited by examiner

FIG. 9
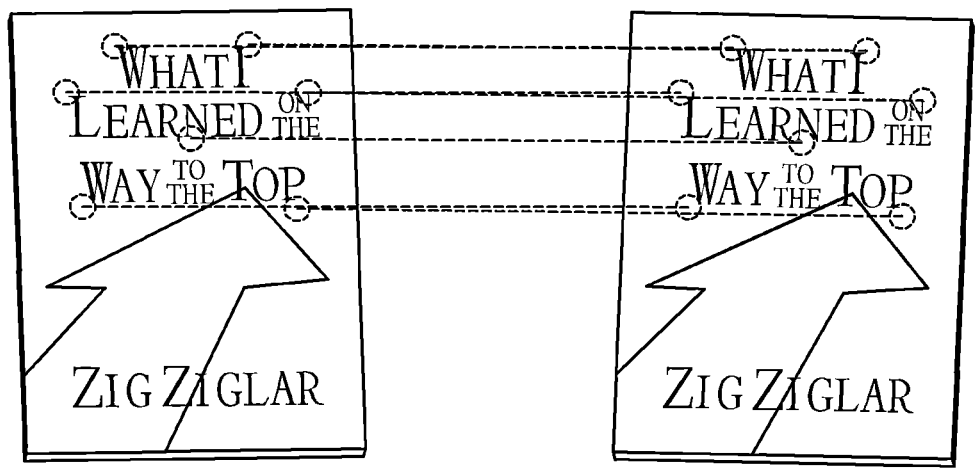
(a)
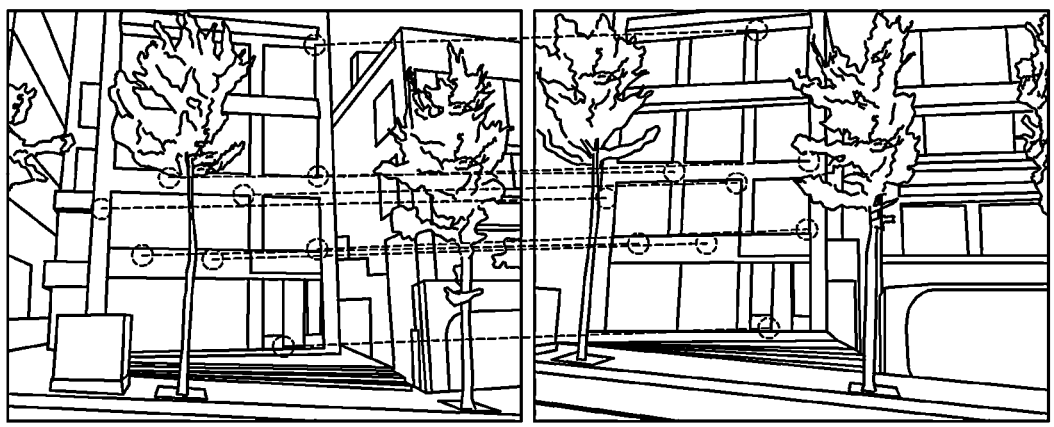
(b)

APPARATUS AND METHOD FOR TRACKING OBJECT USING FEATURE DESCRIPTOR, AND APPARATUS AND METHOD FOR REMOVING GARBAGE FEATURE

CROSS-REFERENCE TO RELATED APPLICATION

This application claims priority to and the benefit of Republic of Korea Patent Application No. 10-2012-0058412, filed on May 31, 2012, the disclosure of which is incorporated herein by reference in its entirety.

BACKGROUND

1. Field of the Invention

The present invention relates to an apparatus and method for tracking an object using a feature descriptor and an apparatus and method for removing a garbage feature, and more specifically, to an apparatus and method for generating a feature descriptor from an input image and removing an erroneously matching feature in order to track an object of interest corresponding to a target object that is a detection target.

2. Discussion of Related Art

With recent performance enhancement of a mobile device, attempts to detect and track an object of interest of an image alone in a mobile device are increasing. Existing algorithms for detecting an object of interest included in an image include Scale Invariant Feature Transform (SIFT) and Speeded Up Robust Features (SURF).

The SIFT algorithm is a method of dividing, in eight directions, a gradient-oriented histogram of each pixel in subareas around a feature extracted from an image, and representing the gradient-oriented histogram in a 128-dimensional vector. For this, since a plurality of differential images must be generated from an original image and a calculation such as vector calculation must be performed on all pixels of each differential image, high accuracy is provided in comparison with other feature-based algorithms but complexity of the calculation is high in tracking the object of interest.

Further, the SURF algorithm is intended to improve the speed of the SIFT algorithm. Processing speed is improved by using an integral image and a high-speed Hessian detector based on a Hessian detector approximated to extract the feature. However, this method has degraded performance of accuracy although the speed is higher than that of the SIFT algorithm.

In U.S. Pat. No. 6,711,293 registered on Mar. 23, 2004, a method of identifying scale invariant features in an image and locating an object included in the image using the feature is disclosed. And U.S. Patent Publication No. 2009/0238460 published on Sep. 24, 2009, a method of searching for scale and rotation invariant features at a high speed is disclosed.

SUMMARY OF THE INVENTION

An object of the present invention is to provide an apparatus and method for tracking an object using a feature descriptor, capable of detecting and tracking an object of interest of an image in real time in a mobile device by mitigating complexity of calculation.

Another object of the present invention is to provide a computer-readable recording medium having a program recorded thereon for causing a computer to execute the method for tracking an object using a feature descriptor, capable of detecting and tracking an object of interest of an image in real time in a mobile device by mitigating complexity of calculation.

Still another object of the present invention is to provide an apparatus and method for removing a garbage feature, capable of improving accuracy of detection and tracking of an object of interest in a mobile environment in which there is much shake.

Still another object of the present invention is to provide a computer-readable recording medium having a program recorded thereon for causing a computer to execute the method for removing a garbage feature, capable of improving accuracy of detection and tracking of an object of interest in a mobile environment in which there is much shake.

According to an aspect of the present invention, there is provided an apparatus for tracking an object, the apparatus including: a feature descriptor generation unit that generates a plurality of features descriptors indicating information of a plurality of features extracted from an input image from which an object of interest is desired to be detected; a matching unit that matches the feature descriptors with feature descriptors of a target object stored in advance, and determines the feature descriptors of the object of interest corresponding to the target object; and a feature point removal unit that removes feature descriptors that do not meet a geometric comparison condition from among the feature descriptors of the object of interest, and establishes final feature descriptors of the object of interest.

According to another aspect of the present invention, there is provided a method of tracking an object, the method including: (a) generating a plurality of features descriptors indicating information of a plurality of features extracted from an input image from which an object of interest is desired to be detected; (b) matching the feature descriptors with feature descriptors of a target object stored in advance, and determining the feature descriptors of the object of interest corresponding to the target object; and (c) removing feature descriptors that do not meet a geometric comparison condition from among the feature descriptors of the object of interest, and establishing final feature descriptors of the object of interest.

According to still another aspect of the present invention, there is provided an apparatus for removing a garbage feature, the apparatus including: an input unit that receives feature descriptors of an object of interest extracted from an input image through matching with feature descriptors of a target object stored in advance; a feature processing unit that applies a previously set geometric comparison condition to the feature descriptors of the object of interest; and a feature establishing unit that removes feature descriptors that do not meet the geometric comparison condition from among the feature descriptors of the object of interest, and establishes final feature descriptors of the object of interest.

According to still another aspect of the present invention, there is provided a method of removing a garbage feature, the method including: (a) receiving feature descriptors of an object of interest extracted from an input image through matching with feature descriptors of a target object stored in advance; (b) applying a previously set geometric comparison condition to the feature descriptors of the object of interest; and (c) removing feature descriptors that do not meet the geometric comparison condition from among the feature descriptors of the object of interest, and establishing final feature descriptors of the object of interest.

According to the apparatus and method for tracking an object using the feature descriptor and the apparatus and method for removing a garbage feature of the present invention, it is possible to improve accuracy of object tracking by applying the geometric comparison condition to features obtained through matching in detecting the object of interest from the input image and removing erroneously matching features, and improve object tracking speed by reducing the amount of calculation. Thus, the apparatuses and the methods are suitable for mobile devices.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 9 is a diagram illustrating an example in which final feature descriptors are established using a geometric comparison condition;

DETAILED DESCRIPTION OF EXEMPLARY EMBODIMENTS

Exemplary embodiments of the apparatus and method for tracking an object using the feature descriptor, and the apparatus and method for removing a garbage feature of the present invention will be described in detail below with reference to the accompanying drawings.

Figure 1:
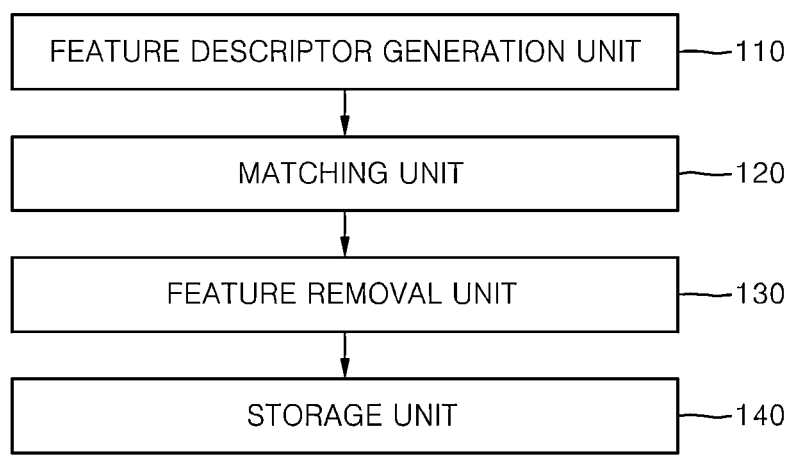
FIG. 1 is a block diagram illustrating a configuration of an apparatus for tracking an object using a feature descriptor according to a preferred exemplary embodiment of the present invention.

FIG. 1 is a block diagram illustrating a configuration of an apparatus for tracking an object using a feature descriptor according to a preferred exemplary embodiment of the present invention.

Referring to FIG. 1, the object tracking apparatus according to the present invention includes a feature descriptor generation unit 110, a matching unit 120, a feature removal unit 130 and a storage unit 140.

The feature descriptor generation unit 110 generates a plurality of features descriptors indicating information of a plurality of features detected from an input image from which an object of interest is desired to be detected. For this, the feature descriptor generation unit 110 may generate the feature descriptors by using a known scheme or changing the known scheme.

Figure 2:
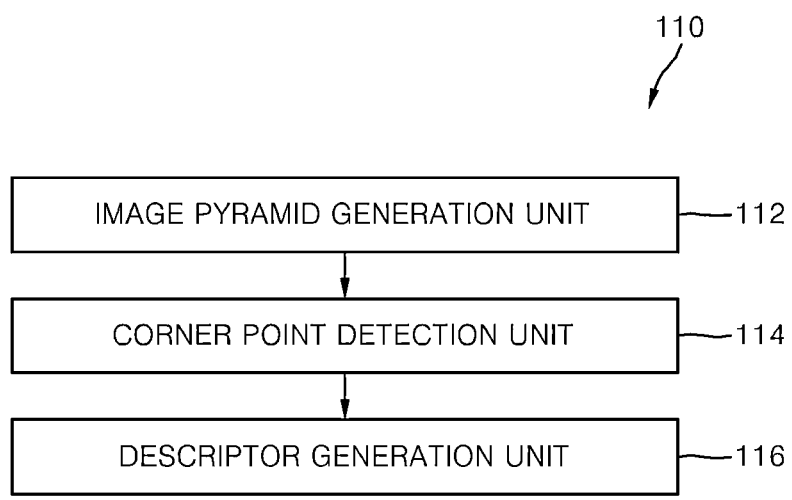
FIG. 2 is a block diagram illustrating a configuration of a feature descriptor generation unit according to an exemplary embodiment.

FIG. 2 is a block diagram illustrating a configuration of the feature descriptor generation unit 110 according to an exemplary embodiment. Referring to FIG. 2, the feature descriptor generation unit 110 may include an image pyramid generation unit 112, a corner point detection unit 114, and a descriptor generation unit 116.

The image pyramid generation unit 112 generates an image pyramid including differential images whose resolution gradually changes from the input image. The image pyramid may be generated by repeatedly applying a low pass filter such as a Gaussian filter to the input image.

Figure 3:
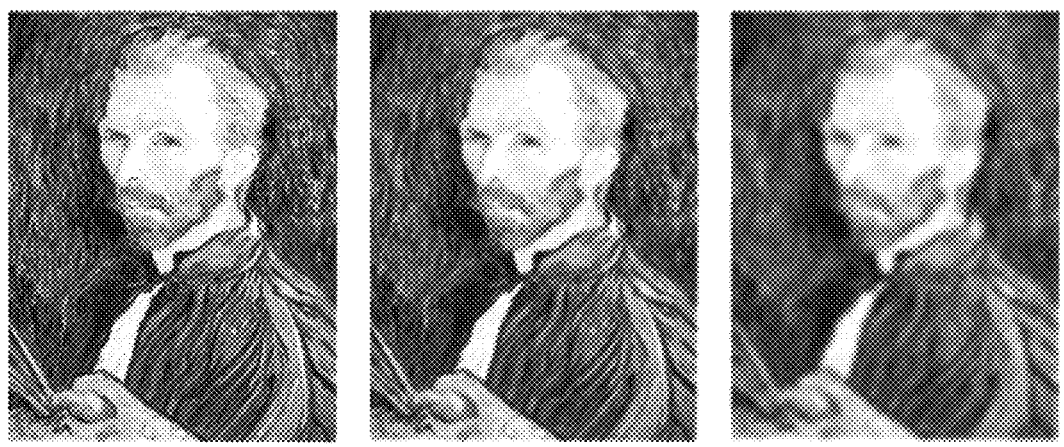
FIG. 3 is a diagram illustrating an exemplary embodiment in which a Gaussian filter is repeatedly applied to an input image to generate an image pyramid.

FIG. 3 is a diagram illustrating an exemplary embodiment in which the Gaussian filter is repeatedly applied to the input image to generate the image pyramid. Referring to FIG. 3, it can be found that the input image is gradually blurred by the Gaussian filter and, as a result, the input image is reduced. The number of differential images constituting the image pyramid, i.e., the number of times the Gaussian filter is applied, may be adaptively set in advance.

The corner point detection unit 114 detects a corner feature from each of the differential images constituting the image pyramid, and determines the corner feature detected in common from the respective differential images of the image pyramid as a scale invariant feature.

In an exemplary embodiment, the corner point detection unit 114 may match values of peripheral pixels in a circular area located within a previously set distance from a center point, for which a confirmation is to be made as to whether the center point is the corner feature using an FAST (Features from Accelerated Segment Test) scheme that is one method for detecting a corner feature, with a value of the center point, and determine whether the center point is the corner feature.

Specifically, when previously set n (e.g., n=12) or more continuous peripheral pixels have a pixel value a previously set threshold or more higher than the center point, or when the n or more continuous peripheral pixels have a pixel value the threshold or more lower than the center point, the corner point detection unit 114 may detect the center point as the corner feature of the differential image. An example in which the corner feature is determined around a center point p is shown in FIG. 4.

Figure 4:
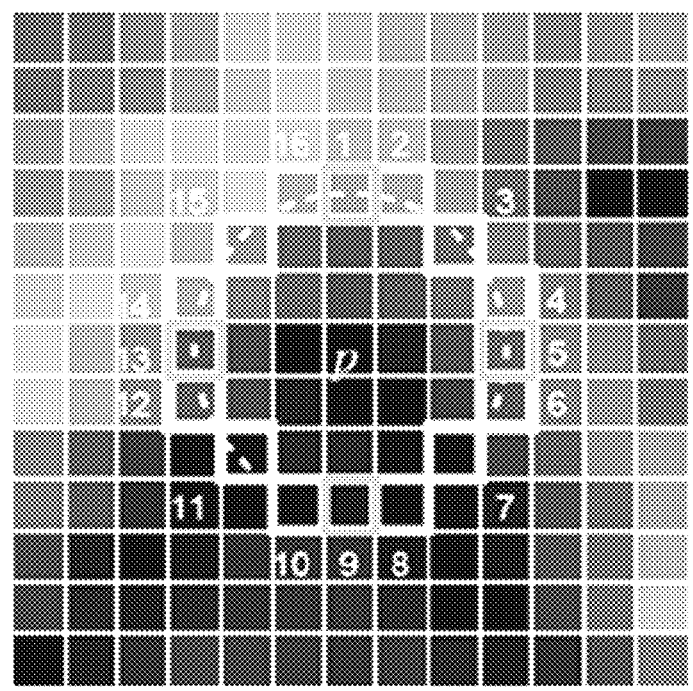
FIG. 4 is a diagram illustrating an example in which a corner feature is determined around the center point p.

Further, the corner point detection unit 114 can rapidly detect the corner feature by matching only four pixels located in vertical and horizontal directions from the center point p, for example, pixels indicated by 1, 5, 9 and 13 in FIG. 4 with the center point p in order to increase the speed of corner feature detection, and then applying a decision tree that is one machine learning method to the peripheral pixels, instead of matching all 16 pixels arranged in a circular form a certain distance apart from the center point p in FIG. 4 with the center point p.

Figure 5:
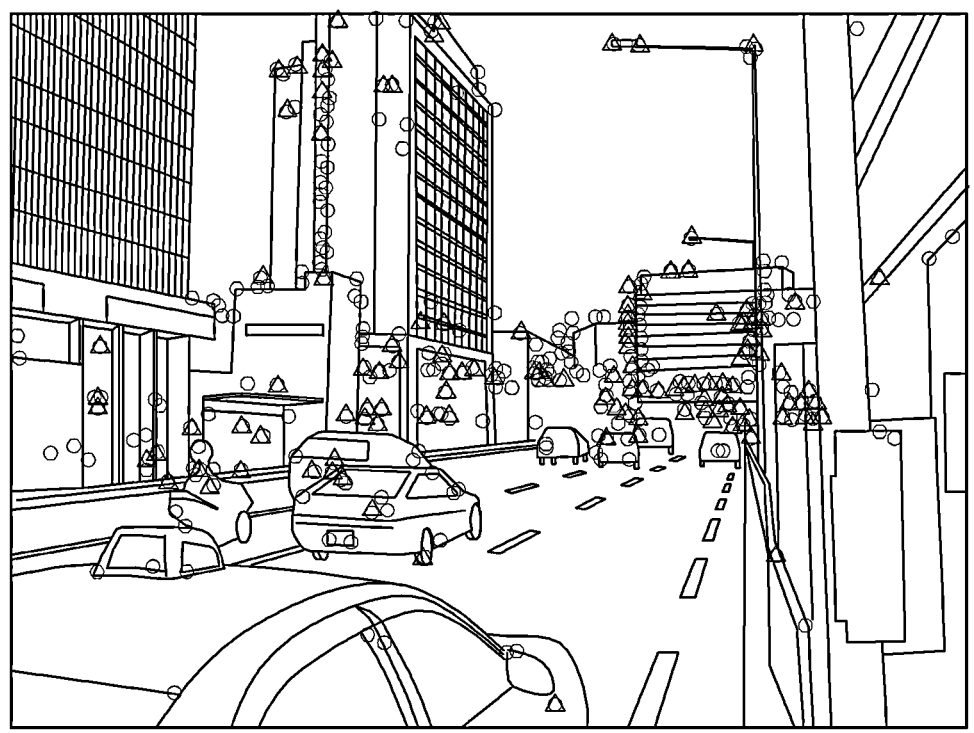
FIG. 5 is a diagram illustrating an exemplary embodiment in which a corner feature is detected using an FAST scheme.

FIG. 5 is a diagram illustrating an exemplary embodiment in which a corner feature is detected using the FAST scheme. In FIG. 5, points indicated by circles indicate corner features around which 9 continuous peripheral pixels have pixel values greater or smaller than a threshold, and points indicated by triangles indicate corner features around which 12 continuous peripheral pixels have pixel values greater or smaller than the threshold The corner point detection unit 114 detects the corner feature from each differential image of the image pyramid using the method described above, and then determines the corner feature detected in common from all differential images as the scale invariant feature for the input image.

Then, the descriptor generation unit 116 generates a feature descriptor for each of the scale invariant features determined by the corner point detection unit 114. In the existing SIFT algorithm, the feature descriptor in a 128-dimensional vector form is generated. On the other hand, the descriptor generation unit 116 can generate the feature descriptor in a 36-dimensional vector form having only gradient components for an x-axis and a y-axis of the image.

Specifically, the descriptor generation unit 116 may generate the scale invariant feature descriptor by dividing a pixel area having a previously set size around each corner feature into a plurality of subareas, calculating the gradients in four directions for each subarea, and then storing the gradients as a histogram. Here, the gradient is a vector indicating a change direction and size of the pixel value, and may be calculated by the following equation 1:

$$\partial x = 1(x+1, y) - 1(x-1, y)$$
$$\partial y = 1(x, y+1) - I(x, y-1)$$
$$\text{magnitude}(x, y) = \sqrt{\partial x^2 + \partial y^2}$$
$$\text{orientation}(x, y) = \tan^{-1}\frac{\partial y}{\partial x}$$

[Equation 1]

Here, I (x, y) denotes a pixel value of a coordinate (x, y) of the image, magnitude (x, y) denotes a size of a gradient of the (x, y) pixel, and orientation (x, y) denotes a direction of the gradient for the (x, y) pixel.

Figure 6:
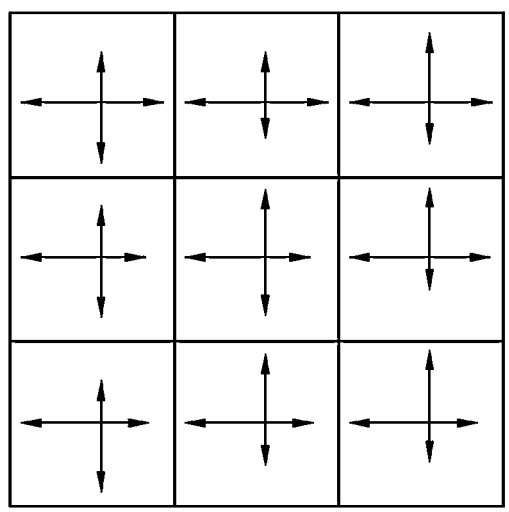
FIG. 6 is a diagram illustrating an example in which a pixel area is divided into 9 subareas to generate feature descriptors.

The descriptor generation unit 116 divides the pixel area around each corner feature into 9 subareas having a 3*3 (pixel) size, and generates a histogram for gradients in four directions for each subarea. As a result, the descriptor generation unit 116 can generate a 36-dimensional feature descriptor. FIG. 6 is a diagram illustrating an example in which a pixel area is divided into 9 subareas to generate the feature descriptor.

Since the present invention is intended to reduce the amount of calculation to rapidly track the object of interest in a mobile device as described above, it is possible to improve calculation speed as compared with the existing SIFT scheme in which a 128-dimensional feature descriptor is generated.

The matching unit 120 matches the feature descriptors generated using the method described above with feature descriptors of the target object stored in advance to determine the feature descriptor of the object of interest corresponding to the target object.

Here, the target object is a target of comparison for detecting the object of interest from the input image. The target object may be a target object stored in a database in advance before image capture for tracking the object of interest starts, or may be an object stored as a target object in a database that is an object of interest detected from a first image frame from which object detection starts when an object is tracked by continuous image capture.

Further, when the object of interest is tracked using the two target objects described above together, accurate detection of the object of interest is possible in consideration of various environmental changes, such as illuminance change, at the time of image capture.

The matching unit 120 calculates a distance between the feature descriptor generated from a current input image and the feature descriptor of the target object stored in a database, and determines only the feature descriptor for which the calculated distance is equal to or less than a previously set threshold, as the feature descriptor of the object of interest.

The distance between the feature descriptors may be calculated using various existing methods. For example, the distance may be calculated using a sum of absolute differences (SAD) as in the following equation 2:

$$SAD = \sum_{i}^{36} |f_n(i) - f'_m(i)|$$

[Equation 2]

Here, $f_n(i)$ is an $i^{th}$ value of the 36-dimensional feature descriptor generated from the input image, and $f_m'(i)$ is an $i^{th}$ value of the feature descriptor corresponding to the target object.

Further, the threshold for determining whether a feature descriptor is the feature descriptor of the object of interest may be calculated by the following equation 3:

Threshold=$w$×(min(dist)+avg(dist))  [Equation 3]

Here, w denotes a weight, and dist denotes a distance value calculated for all feature descriptors generated from the input image.

Meanwhile, even when the feature descriptor corresponding to the object of interest is determined through matching with target object in this way, a matching error may be generated due to a reduced dimension of the feature descriptor. Furthermore, the image captured by a mobile device has higher probability of matching error generation than an image captured in a stationary state.

Therefore, the feature removal unit 130 of the object tracking apparatus according to the present invention removes the feature descriptors that do not satisfy a geometric comparison condition (perspective invariant) from among the feature descriptors of the object of interest, and establishes the final feature descriptors of the object of interest. A garbage feature erroneously matching with the target object can be removed through such an additional filtering process.

Meanwhile, the feature removal unit 130 may be implemented as some components of the object tracking apparatus according to the present invention as described above, or may be implemented as one independent device and used to improve performance of an existing object detection and tracking system.

Figure 7:
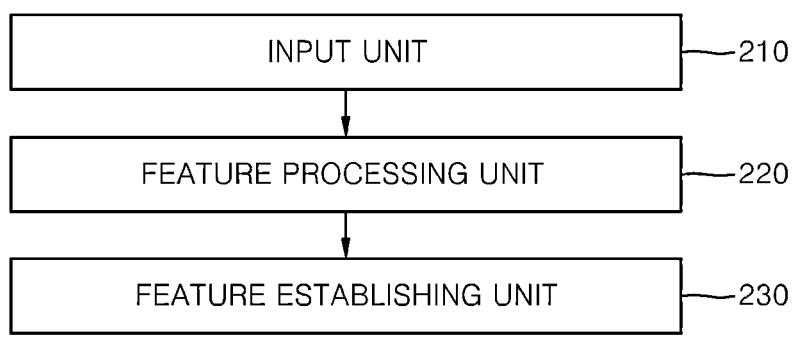
FIG. 7 is a block diagram illustrating a configuration of a garbage feature removal device according to a preferred exemplary embodiment of the present invention.

FIG. 7 is a block diagram illustrating a configuration of the garbage feature removal device according to a preferred exemplary embodiment of the present invention.

Referring to FIG. 7, the garbage feature removal device according to the present invention includes an input unit 210, a feature processing unit 220, and a feature establishing unit 230. Hereinafter, the garbage feature removal device according to the present invention is assumed to have the same configuration as the feature removal unit 130 of the object tracking apparatus according to the present invention described above, and a concrete description is given.

The input unit 210 of the garbage feature removal device according to the present invention receives the feature descriptors of the object of interest extracted from the input image through matching of the feature descriptor of the target object stored in advance. This is the same as the case in which the feature removal unit 130 of the object tracking apparatus according to the present invention receives the feature descriptors of the object of interest determined by the matching unit 120.

Then, the feature processing unit 220 applies a previously set geometric comparison condition to the feature descriptor of the object of interest.

Specifically, the feature processing unit 220 checks whether the feature descriptors of the object of interest meets the geometric comparison condition by matching a ratio of perspective transformation determinants calculated for the feature descriptors of the object of interest with a ratio of perspective transformation determinants calculated for the feature descriptors of the target object.

Figure 8:
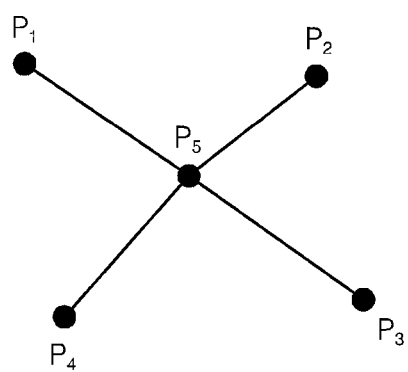
FIG. 8 is a diagram illustrating points on the same plane for check of a geometric comparison condition.

The feature processing unit 220 may use five points located on the same plane of the object of interest and the target object in order to check whether the feature descriptors meets the geometric comparison condition. FIG. 8 is a diagram illustrating points on the same plane for check of the geometric comparison condition.

The five points $P_1$ to $P_5$ as shown in FIG. 8 may be represented by the following equation 4:

$$P_i = (x_i, y_i, z_i)^T \quad \text{[Equation 4]}$$

Here, $P_i$ denotes an $i^{th}$ point (i has a value of 1 to 5), $(x_i, y_i)$ denotes a coordinate in an image of the $i^{th}$ point, and since the five points are located on the same plane, a value of $z_i$ is set to 1.

Next, one 3*3 matrix may be generated from three points $P_i$, $P_j$ and $P_k$ represented by Equation 4, and may be represented by the following equation 5:

$$m_{ijk} = (P_i P_j P_k) \quad \text{[Equation 5]}$$

When $m_{ijk}$ of Equation 5 is a matrix obtained for $P_i$, $P_j$ and $P_k$ of the object of interest, a 3*3 matrix may be similarly generated for $P_i'$, $P_j'$ and $P_k'$ corresponding to $P_i$, $P_j$ and $P_k$ in the target object.

The ratio of the determinants of the matrix generated from the three points in this way is known to be invariant in perspective transformation (P. Putjarupong, C. Pintavirooj, W. Withayachumnankul, and M. Sangworasil, "Image Registration Exploiting Five-point Coplanar Perspective Invariant and Maximum-Curvature Point", In Journal WSCG, volume 12, pages 341348, 2004). In other words, the following equation 6 is met in two different perspective transformations.

$$\frac{|m_{431}||m_{521}|}{|m_{421}||m_{531}|} = \frac{|m'_{432}||m'_{521}|}{|m'_{421}||m'_{531}|} \quad \text{[Equation 6]}$$

The feature processing unit 220 sequentially applies the geometric comparison condition (perspective invariant) such as Equation 6 to the feature descriptors of the object of interest, and the feature establishing unit 230 establishes a final feature descriptor of the object of interest by removing the feature descriptors determined by the feature processing unit 220 not to meet the geometric comparison condition.

Specifically, the feature processing unit 220 first selects five feature descriptors from among the feature descriptors of the object of interest, and sets the five feature descriptors as the initial feature descriptors. Then, the feature processing unit 220 applies the condition of Equation 6 to the initial feature descriptors and corresponding feature descriptors of the target object to check whether the geometric comparison condition is met. Preferably, the feature processing unit 220 may check whether the condition is satisfied by selecting the six feature descriptors from among the feature descriptors of the object of interest, calculating a total of six geometric comparison conditions from every five points using $_6C_5$, and performing comparison.

The feature point establishing unit 230 removes the feature descriptors that do not meet the geometric comparison condition from among the initial feature descriptors. In this case, the number of feature descriptors to be removed may be set in advance.

After the some feature descriptors have been removed by the feature establishing unit 230, the feature processing unit 220 adds a new feature descriptor to the other feature descriptors, and applies the geometric comparison condition for five points on the same plane again.

The feature point establishing unit 230 can establish the final feature descriptors of the object of interest by repeating the above-mentioned process for all the feature descriptors of the object of interest. The above process is similarly performed by the feature removal unit 130 of the object tracking apparatus according to the present invention, as described above.

Referring back to FIG. 1, the storage unit 140 stores the final feature descriptors of the object of interest determined by the feature removal unit 130 in a database (not shown). Further, the storage unit 140 may add new final feature descriptors to the database (not shown) in real time whenever a process in which the feature removal unit 130 selects feature descriptors of the object of interest by 5 and checks whether the geometric comparison condition is met, is repeatedly performed.

FIG. 9 is a diagram illustrating an example in which the final feature descriptors are established using the geometric comparison condition. In the case of (a) of FIG. 9, a ratio of six perspective transformation determinants was calculated from seven points. Matching with the target object with an average error of 4.3% was shown. Further, in the case of (b) of FIG. 9, matching with the target object with an average error of 5.0% was shown.

Figure 10:
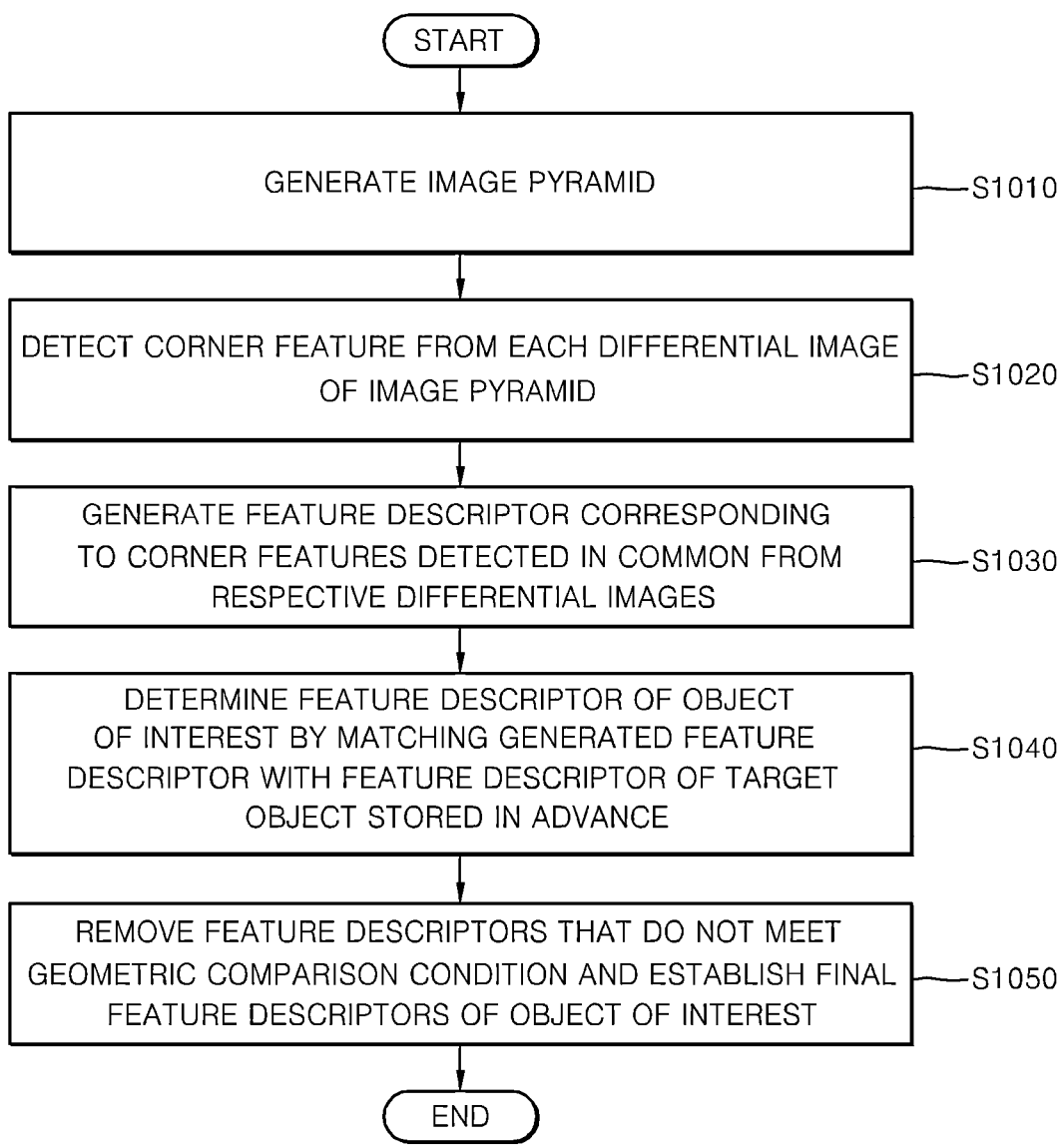
FIG. 10 is a flowchart illustrating a process of a method of tracking an object using a feature descriptor according to a preferred exemplary embodiment of the present invention.

FIG. 10 is a flowchart illustrating a process of the method of tracking an object using a feature descriptor according to a preferred exemplary embodiment of the present invention.

Referring to FIG. 10, the image pyramid generation unit 112 generates the image pyramid including differential images whose resolution gradually changes from an input image (S1010), and the corner point detection unit 114 detects a corner feature from each differential image of the image pyramid (S1020). The image pyramid generation and the corner feature detection may be performed using a known scheme, as described above.

The descriptor generation unit 116 generates the feature descriptor corresponding to each scale invariant feature that is the corner feature detected in common from the respective differential images (S1030).

The matching unit 120 performs feature matching using a method of calculating a distance between the generated feature descriptor and the feature descriptor of the target object stored in advance, and determines the feature descriptor of the object of interest (S1040). The feature removal unit 130 removes the feature descriptors that do not meet the geometric comparison condition from among the feature descriptors of the object of interest, and establishes the final feature descriptors of the object of interest (S1050).

Figure 11:
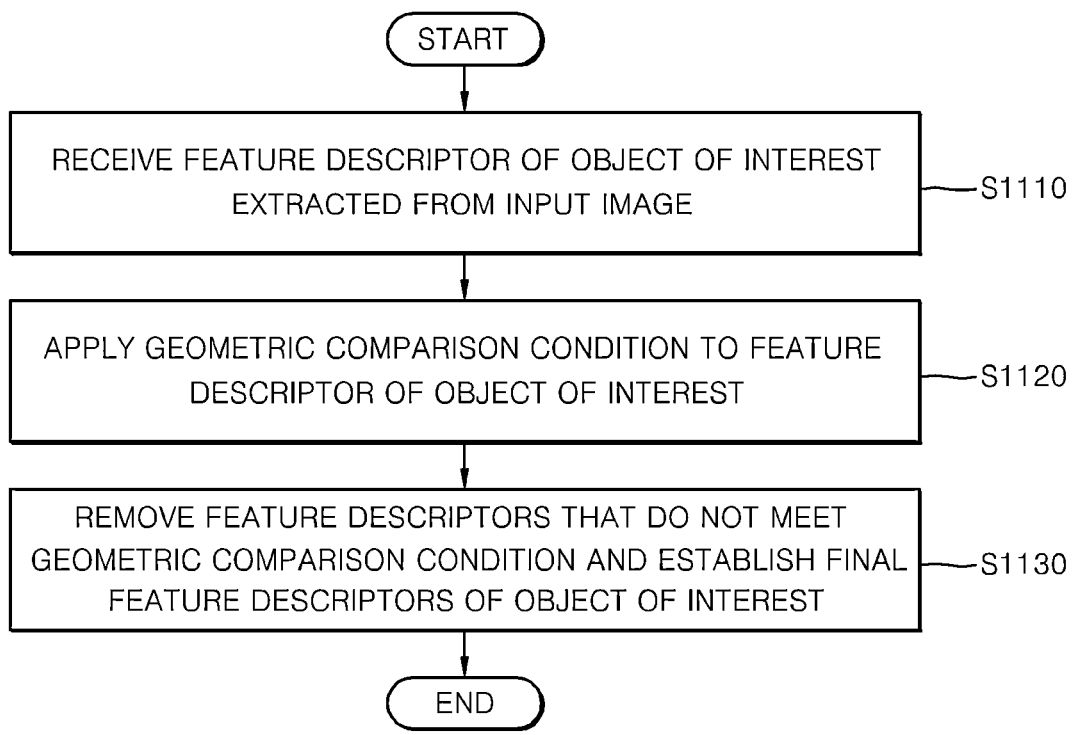
FIG. 11 is a flowchart illustrating a process of a method of removing a garbage feature according to a preferred exemplary embodiment of the present invention.

FIG. 11 is a flowchart illustrating a process of a method of removing a garbage feature according to a preferred exemplary embodiment of the present invention.

Referring to FIG. 11, the input unit 210 receives the feature descriptors of the object of interest extracted from the input image through matching of the feature descriptor of the target object stored in advance (S1110). Then, the feature processing unit 220 applies a previously set geometric comparison condition to the feature descriptor of the object of interest (S1120). Then, the feature point establishing unit 230 removes the feature descriptors that do not meet the geometric comparison condition from among the initial feature descriptors (S1130).

The present invention can be implemented as computer-readable code in a computer-readable recording medium. A computer-readable recording medium include any type of recording device in which data that can be read by a computer system is stored. Examples of computer-readable recording medium include a ROM, a RAM, a CD-ROM, a magnetic tape, a floppy disk, an optical data storage device, etc., and further include a medium implemented in the form of a carrier wave (e.g., transmission through the Internet). Further, the computer-readable recording medium may be distributed to computer systems connected over a network, and computer-readable code may be stored and executed in a distributive manner.

While the preferred exemplary embodiments of the present invention have been shown and described, it will be apparent to those skilled in the art that various modifications can be made without departing from the spirit and scope of the invention.

What is claimed is:

1. An apparatus configured to track an object, the apparatus comprising:
a processor comprising:
a feature descriptor generator configured to generate feature descriptors indicating information of a plurality of features extracted from an input image from which an object of interest is to be detected and defining extracted feature descriptors of the object of interest;
a matcher configured to match the extracted feature descriptors of the object of interest with target object feature descriptors of a target object stored in advance, and to determine one or more of the extracted feature descriptors of the object of interest corresponding to the target object; and
a feature point remover configured to remove extracted feature descriptors of the object of interest that do not meet a geometric comparison condition from among the extracted feature descriptors of the object of interest so as to define one or more final feature descriptors of the object of interest,
wherein the feature descriptor generator comprises:
an image pyramid generator configured to generate an image pyramid including differential images having a resolution which progressively changes from a resolution of the input image to a predetermined resolution different from the resolution of the input image;
a corner point detector configured to detect a corner feature from each differential image constituting the image pyramid, and determine a corner feature detected in common from the respective differential images of the image pyramid as a scale invariant feature; and
a descriptor generator configured to generate a feature descriptor for the scale invariant feature.

2. The apparatus according to claim 1, wherein:
the image pyramid generator is configured to generate the differential images by applying a Gaussian filter to the input image by a previously set number of times.

3. The apparatus according to claim 1, wherein:
when a previously set number of continuous pixels, among pixels located at a previously set distance from a center point that is a pixel selected from one of the differential images, have a pixel value which is greater or smaller than a previously set threshold value in comparison to the center point, the corner point detector determines the center point is the corner feature.

4. The apparatus according to claim 1, wherein:
the descriptor generator is configured to divide a pixel area having a previously set size around the scale invariant feature into a plurality of subareas, and generate the feature descriptor in a vector form corresponding to the scale invariant feature based on a histogram of a gradient value generated for each subarea.

5. The apparatus according to claim 4, wherein:
the descriptor generator is configured to generate the feature descriptor in a 36-dimensional vector form by dividing the pixel area into 9 subareas, and calculate a histogram for four gradient directions to correspond to the respective subareas.

6. The apparatus according to claim 1, further comprising:
a storage configured to store the final feature descriptors of the object of interest in a database.

7. An apparatus configured to track an object, the apparatus comprising:
a processor comprising:
a feature descriptor generator configured to generate feature descriptors indicating information of a plurality of features extracted from an input image from which an object of interest is to be detected and defining extracted feature descriptors of the object of interest;
a matcher configured to match the extracted feature descriptors of the object of interest with target object feature descriptors of a target object stored in advance, and to determine one or more of the extracted feature descriptors of the object of interest corresponding to the target object; and
a feature point remover configured to remove extracted feature descriptors of the object of interest that do not meet a geometric comparison condition from among the extracted feature descriptors of the object of interest so as to define one or more final feature descriptors of the object of interest, wherein:
the feature point remover is configured to establish the final feature descriptors of the object of interest using a geometric comparison condition in which a ratio of perspective transformation determinants calculated for the extracted feature descriptors of the object of interest is equal to a ratio of perspective transformation determinants calculated for the target object feature descriptors of the target object.

8. The apparatus according to claim 7, wherein:
the feature point remover is configured to establish the final feature descriptors of the object of interest by repeatedly performing, on all the extracted feature descriptors of the object of interest, a process of removing a previously set number of extracted feature descriptors that do not meet the geometric comparison condition from five extracted feature descriptors randomly selected from among the extracted feature descriptors of the object of interest, adding a new feature descriptor, and applying the geometric comparison condition.

9. An apparatus for removing a garbage feature, the apparatus comprising:
a processor comprising:
an input device configured to receive feature descriptors of an object of interest extracted from an input image and defining extracted feature descriptors of the object of interest through matching with target object feature descriptors of a target object stored in advance;
a feature processor configured to apply a geometric comparison condition to the extracted feature descriptors of the object of interest; and
a feature establisher configured to remove extracted feature descriptors of the object of interest that do not meet the geometric comparison condition from among the extracted feature descriptors of the object of interest so as to establish final feature descriptors of the object of interest,
wherein the feature descriptors are generated by:
generating an image pyramid including differential images having a resolution which progressively changes from a resolution of the input image to a predetermined resolution different from the resolution of the input image;
detecting a corner feature from each differential image constituting the image pyramid, and determining a corner feature detected in common from the respective differential images of the image pyramid as a scale invariant feature; and
generating a feature descriptor for the scale invariant feature.

10. The apparatus according to claim 9, wherein:
the feature processor is configured to repeatedly perform, on all the extracted feature descriptors of the object of interest, a process of applying the geometric comparison condition to five feature descriptors randomly selected from among the extracted feature descriptors of the object of interest and target object feature descriptors of the corresponding target object, adding a new feature descriptor to other extracted feature descriptors of the object of interest after the extracted feature descriptors of the object of interest that do not meet the geometric comparison condition are removed by the feature establisher, and applying the geometric comparison condition.

11. An apparatus for removing a garbage feature, the apparatus comprising:
a processor comprising:
an input device configured to receive feature descriptors of an object of interest extracted from an input image and defining extracted feature descriptors of the object of interest through matching with target object feature descriptors of a target object stored in advance;
a feature processor configured to apply a geometric comparison condition to the extracted feature descriptors of the object of interest; and
a feature establisher configured to remove extracted feature descriptors of the object of interest that do not meet the geometric comparison condition from among the extracted feature descriptors of the object of interest so as to establish final feature descriptors of the object of interest, wherein:
the feature processor is configured to use a geometric comparison condition in which a ratio of perspective transformation determinants calculated for the extracted feature descriptors of the object of interest is equal to a ratio of perspective transformation determinants calculated for the target object feature descriptors of the target object corresponding to the extracted feature descriptors of the object of interest.

12. A method of tracking an object, the method comprising:
(a) generating feature descriptors indicating information of a plurality of features extracted from an input image from which an object of interest is to be detected and defining extracted feature descriptors;
(b) matching the extracted feature descriptors of the object of interest with target object feature descriptors of a target object stored in advance, and determining one or more of the extracted feature descriptors of the object of interest corresponding to the target object; and
(c) removing extracted feature descriptors of the object of interest that do not meet a geometric comparison condition from among the extracted feature descriptors of the object of interest so as to establish final feature descriptors of the object of interest, wherein operation (a) includes:
(a1) generating an image pyramid including differential images having a resolution which progressively changes from a resolution of the input image to a predetermined resolution different from the resolution of the input image, and generating the feature descriptors based on the image pyramid;
(a2) detecting a corner feature from each differential image constituting the image pyramid, and determining a corner feature detected in common from the respective differential images of the image pyramid as a scale invariant feature; and
(a3) generating a feature descriptor for the scale invariant feature.

13. The method according to claim 12, wherein:
operation (a1) includes generating the differential images by applying a Gaussian filter to the input image by a previously set number of times.

14. The method according to claim 12, wherein:
when a previously set number of continuous pixels, among pixels located at a previously set distance from a center point that is a pixel selected from the differential image, have a pixel value which is greater or smaller than a previously set threshold value in comparison to the center point, operation (a2) includes determining the center point as the corner feature.

15. The method according to claim 12, wherein:
operation (a3) includes dividing a pixel area having a previously set size around the scale invariant feature into a plurality of subareas, and generating the feature descriptor in a vector form corresponding to the scale invariant feature based on a histogram of a gradient value generated for each subarea.

16. The method according to claim 15, wherein:
operation (a3) includes generating the feature descriptor in a 36-dimensional vector form by dividing the pixel area into 9 subareas, and calculating a histogram for four gradient directions to correspond to the respective subareas.

17. The method according to claim 12, further comprising:
(d) storing the final feature descriptors of the object of interest in a database.

18. A method of tracking an object, the method comprising:
- (a) generating feature descriptors indicating information of a plurality of features extracted from an input image from which an object of interest is to be detected and defining extracted feature descriptors;
- (b) matching the extracted feature descriptors of the object of interest with target object feature descriptors of a target object stored in advance, and determining one or more of the extracted feature descriptors of the object of interest corresponding to the target object; and
- (c) removing extracted feature descriptors of the object of interest that do not meet a geometric comparison condition from among the extracted feature descriptors of the object of interest so as to establish final feature descriptors of the object of interest, wherein:
- operation (c) includes establishing the final feature descriptors of the object of interest using a geometric comparison condition in which a ratio of perspective transformation determinants calculated for the extracted feature descriptors of the object of interest is equal to a ratio of perspective transformation determinants calculated for the target object feature descriptors of the target object.

19. The method according to claim 18, wherein:
operation (c) includes establishing the final feature descriptors of the object of interest by repeatedly performing, on all the extracted feature descriptors of the object of interest, a process of removing a previously set number of extracted feature descriptors of the object of interest that do not meet the geometric comparison condition from five extracted feature descriptors of the object of interest randomly selected from among the extracted feature descriptors of the object of interest, adding a new feature descriptor, and applying the geometric comparison condition.

20. A method of removing a garbage feature, the method comprising:
- (a) receiving feature descriptors of an object of interest extracted from an input image and defining extracted feature descriptors through matching with target object feature descriptors of a target object stored in advance;
- (b) applying a geometric comparison condition to the extracted feature descriptors of the object of interest; and
- (c) removing extracted feature descriptors of the object of interest that do not meet the geometric comparison condition from among the extracted feature descriptors of the object of interest so as to establish final feature descriptors of the object of interest,
- wherein the feature descriptors are generated by:
  - generating an image pyramid including differential images having a resolution which progressively changes from a resolution of the input image to a predetermined resolution different from the resolution of the input image;
  - detecting a corner feature from each differential image constituting the image pyramid, and determining a corner feature detected in common from the respective differential images of the image pyramid as a scale invariant feature; and
  - generating a feature descriptor for the scale invariant feature.

21. A method of removing a garbage feature, the method comprising:
- (a) receiving feature descriptors of an object of interest extracted from an input image and defining extracted feature descriptors through matching with target object feature descriptors of a target object stored in advance;
- (b) applying a geometric comparison condition to the extracted feature descriptors of the object of interest; and
- (c) removing extracted feature descriptors of the object of interest that do not meet the geometric comparison condition from among the extracted feature descriptors of the object of interest so as to establish final feature descriptors of the object of interest, wherein:
- operation (b) includes using a geometric comparison condition in which a ratio of perspective transformation determinants calculated for the extracted feature descriptors of the object of interest is equal to a ratio of perspective transformation determinants calculated for the target object feature descriptors of the target object corresponding to the extracted feature descriptors of the object of interest.

22. A method of removing a garbage feature, the method comprising:
- (a) receiving feature descriptors of an object of interest extracted from an input image and defining extracted feature descriptors through matching with target object feature descriptors of a target object stored in advance;
- (b) applying a geometric comparison condition to the extracted feature descriptors of the object of interest; and
- (c) removing extracted feature descriptors of the object of interest that do not meet the geometric comparison condition from among the extracted feature descriptors of the object of interest so as to establish final feature descriptors of the object of interest, wherein:
- operation (b) includes repeatedly performing, on all the extracted feature descriptors of the object of interest, a process of applying the geometric comparison condition to five extracted feature descriptors of the object of interest randomly selected from among the extracted feature descriptors of the object of interest and target object feature descriptors of the corresponding target object, adding a new feature descriptor to other extracted feature descriptors of the object of interest after the extracted feature descriptors of the object of interest that do not meet the geometric comparison condition are removed by the removing of the extracted feature descriptors of the object of interest, and applying the geometric comparison condition.

23. A non-transitory computer-readable medium having recorded thereon a program which causes a computer to execute a method of tracking an object, the method comprising:
- (a) generating feature descriptors indicating information of a plurality of features extracted from an input image from which an object of interest is to be detected and defining extracted feature descriptors;
- (b) matching the extracted feature descriptors of the object of interest with target object feature descriptors of a target object stored in advance, and determining one or more of the extracted feature descriptors of the object of interest corresponding to the target object; and
- (c) removing extracted feature descriptors of the object of interest that do not meet a geometric comparison condition from among the extracted feature descriptors of the object of interest so as to establish final feature descriptors of the object of interest, wherein operation (a) includes:
- (a1) generating an image pyramid including differential images having a resolution which progressively changes from a resolution of the input image to a predetermined resolution different from the resolution of the input image, and generating the feature descriptors based on the image pyramid;

(a2) detecting a corner feature from each differential image constituting the image pyramid, and determining the corner feature detected in common from the respective differential images of the image pyramid as a scale invariant feature; and (a3) generating a feature descriptor for the scale invariant feature.

24. A non-transitory computer-readable medium having recorded thereon a program which causes a computer to execute a method of removing a garbage feature, the method comprising:

(a) receiving feature descriptors of an object of interest extracted from an input image and defining extracted feature descriptors through matching with target object feature descriptors of a target object stored in advance;

(b) applying a geometric comparison condition to the extracted feature descriptors of the object of interest; and (c) removing extracted feature descriptors of the object of interest that do not meet the geometric comparison condition from among the extracted feature descriptors of the object of interest so as to establish final feature descriptors of the object of interest, wherein the feature descriptors are generated by:

generating an image pyramid including differential images having a resolution which progressively changes from a resolution of the input image to a predetermined resolution different from the resolution of the input image;

detecting a corner feature from each differential image constituting the image pyramid, and determining a corner feature detected in common from the respective differential images of the image pyramid as a scale invariant feature; and generating a feature descriptor for the scale invariant feature.

* * * * *